Sept. 17, 1968 E. F. O'BRIEN 3,401,943

METHOD OF OPERATING AN AUTOMATIC PHONOGRAPH

Filed March 17, 1967

INVENTOR.
EDWARD F. O'BRIEN

BY

Eliot S. Gerber
ATTORNEY 3,401,943

METHOD OF OPERATING AN AUTOMATIC PHONOGRAPH

Edward F. O'Brien, 86—10 34th Ave., Jackson Heights, N.Y. 11372

Filed Mar. 17, 1967, Ser. No. 623,904
3 Claims. (Cl. 274—1)

The present invention relates to a method of operating an automatic phonograph and more particularly to a method of replaying one side of a disk record one or more times.

A paragraph abstract of the present invention is as follows: Certain types of automatic phonograph playing machines are adapted to support a plurality of records on their central spindle and to drop them, one at a time, onto the turntable. The present invention provides a small flat blank, preferably a disk. The small disk drops onto the turntable and the phonograph automatically replays the previous record. The present invention also provides a thicker blank which acts, by remaining on the spindle, to continuously replay one side of the record.

It is sometimes desirable to replay one side of a conventional disk record one, or a number, of times. One may wish to repeat a record, for example, in practicing the learning of code, or in learning a foreign language, or in memorizing a musical composition. At the present time such a replaying may be obtained by using a manual record phonograph machine or by switching an automatic phonograph to manual playing. The operator must then place, by hand, the record playing tone arm at the beginning outer groove of the record at the end of each play of the record. This is inconvenient and, when the record is used for learning, interrupts the learning process.

It is the objective of the present invention to provide a simple and low-cost method in which one side of a record may be automatically replayed, one or more times, on a conventional automatic record-playing machine without the need for special and costly machinery or a permanent change in the machine.

In accordance with one aspect of the present invention, a small, preferably disk-shaped, flat blank having a hole is placed on the record spindle of an automatic phonograph. The blank is placed on top of the record desired to be replayed. The automatic phonograph, at the end of the first playing of the record desired to be replayed, will drop the small disk on the record exactly as if it were another record. The phonograph will then replay the first record because the small disk is inside its innermost groove.

In an alternative according to the present invention, a a thick, preferably disk-shaped object is used to replay a record a number of times. The thick disk is placed on the spindle of an automatic record player following, i.e., on top of, the record desired to be replayed. The thick disk, preferably of two records thickness, is not dropped onto the turntable at the end of the record to be replayed because of its construction. Instead, the thick disk remains on the spindle to continuously trip the spindle's automatic mechanism, so that the record already on the turntable is repeatedly played. When the repeat feature is no longer desired, the disk blank is removed from the spindle to permit the record to play out and automatically shut off the machine, or one may manually shut it off.

Other objectives of the present invention will be apparent from the following description of an embodiment, taken in conjunction with the accompanying drawings. In the drawings.

The method of the present invention contemplates the use of a conventional automatic phonograph record playing machine. An example of a suitable machine for use in the present invention is the "Lab 80" automatic phonograph, manufactured by Garrard Engineering Limited, of Newcastle Street, Swindon, Wiltshire, Great Britain. This, and similar types of machines, include a base, a driving motor, a revolving turntable mounted on a shaft, one or more bearings supporting the shaft and means (such as gears or a belt) connecting the driving motor selectly to the turntable, and a central spindle rising above the turntable and about which the turntable revolves. The phonograph also includes controls for connecting the motor to a source of electric power and for selecting the speed of the turntable, and a playing tone arm having a transducer at its end which converts the grooved impressions on the record into electrical impulses representing those impressions. This type of phonograph is adapted to play phonograph records in the form of flat disks having a tightly wound helical groove whose impression represents the sounds on the record. Such records are conventionally made to be revolved at 33 revolutions per minute, 45 revolutions per minute, or 78 revolutions per minute, and also 16 revolutions per minute, but rarely.

Figure 1:
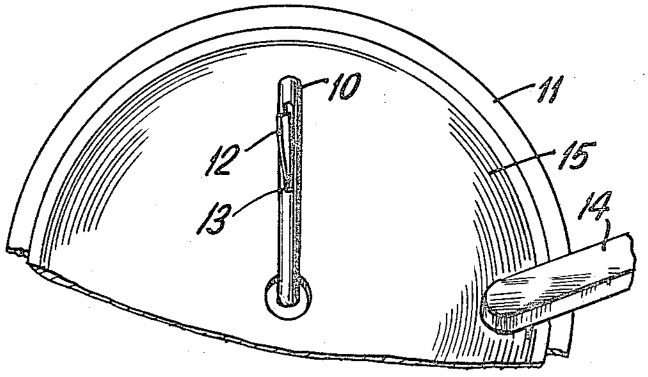
FIG. 1 is a perspective view of the top portion of a conventional typical automatic phonograph spindle and a portion of its surrounding mechanism.

The spindle of the machine, a view of which is shown in FIG. 1, includes a central shaft member 10 which protrudes above the level of the turntable 11. In automatic machines of the Lab 80 type, a flange member 12 protrudes from the cylindrical surface of the spindle 10. The flange member 12 is adapted to be selectly withdrawn within a groove 13 so that it is within the circumference of the outer surface of the spindle 10. The operation of the flange member 12, to within its groove or protruding from its groove, is by means of the automatic mechanism of the phonograph. When the phonograph is placed in automatic operation by means of the control mechanism, it drops one record at a time when the tone arm has swung sufficiently inward towards the spindle. The inward swinging of the tone arm is caused by the helical groove of the record, which terminates in an innermost groove which is the area where the automatic processes are actuated to shut off the machine or play another record.

Figure 2:
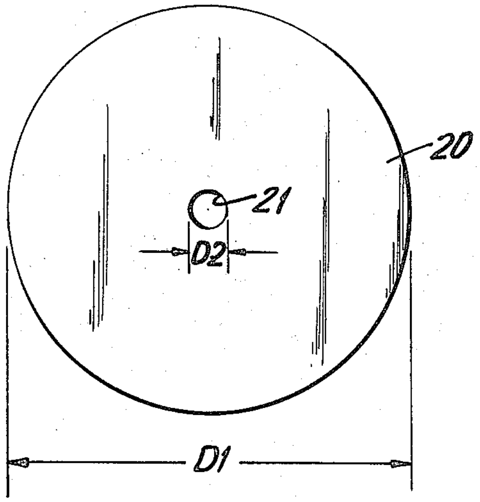
FIG. 2 is a top plan view of a disk used in the first embodiment of the present invention.

The present invention enables the user of the automatic phonograph to repeat a desired record. In the first embodiment, a small blank 20 is utilized. The blank 20, shown in FIG. 2, is round and relatively thin. The outer boundary of the blank is not critical as to its shape. However, it is necessary that the outer boundary of the blank 20 be of a size so that its outer circumference is entirely within the inner circumference of the innermost groove of the record which is to be replayed. The blank 20 has an inner central hole 21, which is of the same size as the record spindle, i.e., the hole 21 is of the same size as the record which is to be replayed. In the case of a 33 r.p.m. record, the preferred dimensions of blank 20 are that its outer diameter D1 is three inches; the diameter D2 of its inner hole 21 is $^{10}/_{32}$ of an inch; and the thickness is the same as the thickness of the record, i.e., about $^{1}/_{32}$ of an inch. The record blank 20 for use along with a 45 r.p.m. record has the following preferred dimensions: inner hole D2 of a diameter of 1½ inches; outer boundary in a round blank having a diameter D1 of 3½ inches, and the thickness the same as that of the conventional 45 r.p.m. record, about $^{1}/_{32}$ of an inch.

The material of the record may be a relatively inexpensive plastic, for example, polystyrene. The plastic material of the blank need not be of record quality since grooves are not impressed on it. Alternatively, a record plastic such as black linear vinyl may be used.

In operation, the operator places the record to be replayed on the spindle 10 of an automatic record playing machine. He also places the blank 20 shown in FIG. 2 on top of the record to be replayed. He then places the phonograph control to automatic and starts the machine by depressing a start button. The record to be replayed will automatically drop onto the turntable 11. The tone arm 14 will automatically enter one of the outermost grooves of the record and commence playing. The record will play through its entire length and the tone arm will gradually move along the helical groove of the record until it arrives at the innermost grooves of the record. The tone arm is then automatically lifted and moved away from the spindle 10. The flange member 12 is automatically withdrawn into its groove 13, while all other records are held in position on the spindle by the spindle's mechanism or other associated mechanisms and the blank 20 falls on top of the record 15. The tone arm will again move into one of the outermost grooves of the record 15 while the spindle's mechanism releases the aforesaid hold on the stacked records, allowing them to drop to the top of the flange. The entire record 15 will then be replayed until the tone arm again has reached its innermost grooves. If it is desired that the record be replayed twice, it is necessary to stack two of the blanks 20 above the record to be replayed. Similarly, for three replays, three such blanks would be used. Indeed, as many replays may be maintained as blanks can be stacked on the spindle. It is possible to play a second record by stacking it on top of the blank. If it is desired that the second record be replayed, it is necessary to place another blank on top of the second record to be replayed.

Figure 3:
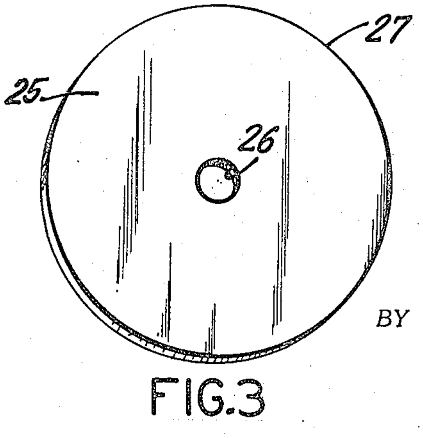
FIG. 3 is a perspective view of a disk used in the second embodiment of the present invention.

In the second embodiment of the present invention, a blank 25 shown in FIG. 3 is used in order to replay the record a plurality of times without using additional blanks. In this embodiment, if the blank is for use with a 33 r.p.m. record to be replayed, it preferably has an outer diameter D1 of three inches and an inner hole diameter D2 of $^{10}/_{32}$ of an inch. The thickness of the blank, contrasted to the thickness of the blank of the first embodiment, is of two records thick, that is, $1/8$ of an inch. The innner hole 26 should be the same diameter as the record to be replayed and it should have twice its thickness, i.e., length along the axis of its hole. The outside boundary 27 of the blank 25 is not critical as the blank is not dropped onto the turntable, that is, the blank may have an exterior edge of any shape and size. The material of the blank 25 is not critical and may be made of a relatively inexpensive plastic such as polystyrene or a vinyl material.

In operation, the operator places the record desired to be replayed on the spindle 10 of an automatic record playing machine, as above. He then stacks the blank 25 above the record to be replayed. He then places the machine on automatic operation and depresses the start button. The tone arm will automatically move to within one of the outermost grooves of the record 15. The record will be played through once and the tone arm will move inwardly towards the spindle. When the tone arm has reached the inner grooves of the record 15, it will be lifted and automatically moved back to an outermost groove of the record 15. During this time the flange 12 will be withdrawn into its groove 13. Due to the thickness of the blank, the blank will not fall down the spindle. The machine, however, will react as if another record had fallen on top of the record to be replayed. This process will be continued, i.e., the record will be replayed over and over again, until the operator shuts off the machine or removes the disk blank to allow the record to play out and automatically shut off the machine.

The thick blank will not fall down the spindle, when the tone arm reaches the end of the record, because the thick blank willl be held by the spindle's hold mechanism.

I claim:

1. The method of automatically replaying a record, comprising the steps of, placing a flat record disk to be replayed on the spindle of an automatic phonograph record playing machine having a turntable, the said record having a record groove terminating in an innermost groove, placing a small thin flat blank, having a hole, on the spindle on top of the said record with the spindle within said hole, the outer circumference of said blank being of a size to fit within the said innermost groove on said record, and said blank having a thickness of about $1/16$ of an inch, and operating said record player to drop said record on its turntable and play the said record and to then drop the said blank on top of the said record and to replay the said record.

2. The method of claim 1 wherein a second blank is placed on top of the first blank, said second blank being a small thin flat blank having a hole adapted to fit on the said spindle, said second blank being of a size to fit within the said innermost groove on said record, and said blank having a thickness of about $1/16$ of an inch.

3. The method of automatically replaying a record, comprising the steps of, placing a flat record disk to be replayed on the spindle of an automatic phonograph record playing machine, the said record having a record groove terminating in an innermost groove, placing a small flat blank, having a hole, on the spindle on top of the said record with the spindle within said hole, and said blank having a thickness of at least about $1/8$ of an inch, and operating said record player to drop the said record on the said turntable and play the said record and to then partially lower the said blank toward the top of the said record and to replay the said record.

References Cited

UNITED STATES PATENTS 3,360,257 12/1967 Kelley ............... 274—1

LEONARD FORMAN, *Primary Examiner.*

L. V. ANDERSON, *Assistant Examiner.*